(12) United States Patent
Schneider et al.

(10) Patent No.: US 11,092,265 B2
(45) Date of Patent: Aug. 17, 2021

(54) FITTING TO BE CONNECTED TO AT LEAST ONE PIPE AND METHOD FOR ESTABLISHING A CONNECTION

(71) Applicant: Viega Technology GmbH & Co. KG, Attendorn (DE)

(72) Inventors: Andreas Schneider, Finnentrop—Schoenholthausen (DE); Dominik Kramer, Attendorn (DE); David Schmitt, Attendorn (DE); Nadine Riili, Lennestadt (DE); Detlev Schmitt, Drolshagen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 16/494,061

(22) PCT Filed: Mar. 14, 2018

(86) PCT No.: PCT/EP2018/056417
§ 371 (c)(1),
(2) Date: Sep. 13, 2019

(87) PCT Pub. No.: WO2018/167158
PCT Pub. Date: Sep. 20, 2018

(65) Prior Publication Data
US 2020/0378530 A1    Dec. 3, 2020

(30) Foreign Application Priority Data
Mar. 15, 2017  (DE) .................... 10 2017 105 505.3

(51) Int. Cl.
*F16L 13/14*    (2006.01)
*F16L 33/207*   (2006.01)

(52) U.S. Cl.
CPC ......... *F16L 13/143* (2013.01); *F16L 33/2076* (2013.01); *F16L 13/146* (2013.01);
(Continued)

(58) Field of Classification Search
CPC ..... F16L 13/143; F16L 13/146; F16L 13/141; F16L 33/2076; F16L 33/2078; F16L 33/2073; F16L 2013/145
(Continued)

(56) References Cited

U.S. PATENT DOCUMENTS 2,679,409 A * 5/1954 Spender .............. F16L 33/2076
4,726,612 A * 2/1988 Picton ................. F16L 33/2076
                                                                285/256
(Continued)

FOREIGN PATENT DOCUMENTS

AU    2013307584 B2    3/2014
CN    104838192 A      8/2015
(Continued)

OTHER PUBLICATIONS

Dardarelli, "Materials Handbook—A Concise Desktop Reference", 10 pages, Second Edition, Springer, 2008.
(Continued)

*Primary Examiner* — Zachary T Dragicevich
(74) *Attorney, Agent, or Firm* — The Webb Law Firm

(57) ABSTRACT

The invention relates to a fitting to be connected to at least one pipe, in particular a plastic pipe or plastic-metal composite pipe, having a main body, having at least one supporting body connected to the main body for insertion into a pipe end and having at least one pressing sleeve connected to the main body for receiving the pipe end, the pressing sleeve having a cylindrical pressing section. The technical problem of improving the fitting for pressing, in particular with small motor-driven or manually driven pressing tools,
(Continued)

is solved by the fact that the pressing sleeve is made of a metal with a microhardness of less than 65 HV 1, in particular less than 50 HV 1, preferably in the range from 40 to 50 HV 1 measured according to Vickers, and that the ratio of wall thickness of the pressing section to the outer diameter of the pressing section is less than 0.06, preferably in the range from 0.03 to 0.06. The invention also relates to a method for establishing a connection.

6 Claims, 7 Drawing Sheets

(52) U.S. Cl.
CPC ..... *F16L 33/2078* (2013.01); *F16L 2013/145* (2013.01); *F16L 2201/10* (2013.01)

(58) Field of Classification Search
USPC .................................................. 285/256, 382
See application file for complete search history.

(56) References Cited

U.S. PATENT DOCUMENTS

| 8,123,257 | B1* | 2/2012 | Baer | F16L 33/2073 |
|---|---|---|---|---|
| | | | | 285/256 |
| 8,936,281 | B2* | 1/2015 | Beckmann | F16L 13/141 |
| | | | | 285/256 |
| 2006/0097518 | A1 | 5/2006 | Bott et al. | |
| 2006/0220378 | A1* | 10/2006 | Li | F16L 13/143 |
| 2009/0218814 | A1* | 9/2009 | Kern | F16L 13/141 |
| 2010/0109319 | A1* | 5/2010 | Zhang | F16L 13/141 |
| 2012/0133125 | A1* | 5/2012 | Yoshino | F16L 33/2073 |
| | | | | 285/256 |

FOREIGN PATENT DOCUMENTS

| DE | 19545361 A1 | 6/1997 |
|---|---|---|
| DE | 29521706 U1 | 5/1998 |
| DE | 19545361 C2 | 6/2000 |
| DE | 10233559 B3 | 1/2004 |
| DE | 102012108146 A1 | 3/2014 |
| EP | 1790896 A1 | 5/2007 |
| EP | 1525419 B1 | 7/2007 |
| EP | 1933073 A1 | 6/2008 |

OTHER PUBLICATIONS

"Copper", Wikipedia, https://en.wikipedia.org/wiki/Copper.

Czichos et al., "Materials Measurement Methods", 7 pages, Springer, 2006.

"The Online Materials Information Resource", MatWeb—Overview of Materials for Aluminum Alloy, http://web.archive.org/web/20191011200958/http://www.matweb.com/search/DataSheetaspx?MatGUID=ab8aeb2d293041c4a844e397b5cfbd4e&ckck=1.

* cited by examiner

FITTING TO BE CONNECTED TO AT LEAST ONE PIPE AND METHOD FOR ESTABLISHING A CONNECTION

CROSS-REFERENCE TO RELATED APPLICATIONS

This application is the United States national phase of International Application No. PCT/EP2018/056417 filed Mar. 14, 2018, and claims priority to German Patent Application No. 10 2017 105 505.3 filed Mar. 15, 2017, the disclosures of which are hereby incorporated by reference in their entirety.

BACKGROUND OF THE INVENTION

Field of the Invention

The invention relates to a fitting to be connected to at least one pipe, in particular a plastic pipe or plastic-metal composite pipe, with a main body, with at least one supporting body connected to the main body, preferably integrally formed therewith, for insertion into a pipe end and with at least one pressing sleeve connected to the main body for receiving the pipe end, wherein the pressing sleeve has a cylindrical pressing section. In addition, the invention also relates to a method for establishing a connection between a fitting and a pipe.

Description of Related Art

The technical field relevant to this invention is the on-site installation of pipeline systems, in which a pipeline system consisting of pipe sections and fittings is generally installed for conducting a fluid. A fitting is generally understood to be a connecting piece of a pipeline and is most frequently used to connect two or more pipe sections. The fitting accordingly has two or more pressing sections. The most common fittings include straight connections, changes of direction in the form of pipe bends, reducers, branches such as T-pieces or crossings. However, a fitting is also to be understood as a pipe connection of a valve or other component. For example, thermometers or manometers as armatures have only one connection for one pipe section. Thus, this fitting then only has one pressing section to connect a pipe section to the armature.

Press connections are used to connect the pipe sections with the fittings and other components, where a pressing section of a fitting is formed radially inwards using a pressing tool when the pipe section is inserted, so that a permanent and tight, if necessary even non-detachable connection is produced. The fittings can be equipped with a sealing means, for example an O-ring, which ensures the tightness of the connection, or by a direct contact between the materials of the pipe section and the fitting, for example a metallic seal.

Pressing technology for radial forming of the pressing section can be a purely radially acting pressing system or pressing systems that use radial-axial pressing, whereby part of the fitting is axially displaced during the pressing process in order to cause a radial forming.

The pipeline systems described above are used in particular for transporting drinking or heating water, gas for operating a heating system or industrial gases.

Pressing sleeves made of stainless steel are the preferred choice for radially pressed pressing systems for plastic and plastic-metal multilayer composite pipes. However, due to the geometry and material thickness used, these require high forming and pressing forces in order to establish the connection. Therefore, expensive, special and electrically driven pressing machines and pressing jaws are required. Hand pressing tools, which are used for individual pressing operations, e.g. for repairs, are large and unwieldy and require high actuating forces.

In EP 1 933 073 A1 for example a press fitting for a pipe is described, which is pressed by a pressing tool and allows for a connection of a pipe to be connected.

Furthermore, highly contoured pressing geometries are used with regard to the stability of the pressing connection to be achieved. However, these pressing geometries favor the clamping of the pressing jaws on the pressing sleeve and the formation of pressing folds, which can damage the pressing jaws and cause leaks. Therefore, a tight connection can usually only be guaranteed by at least one elastomer seal in the pressing area.

In addition, the well-known pressing sleeves offer no or only insufficient guidance for the pressing tool or can shift themselves during pressing. Therefore, leaky connections are the result.

In addition, the insertion depth of the pipe is difficult to detect despite any, if necessary, bores in the wall of the pressing sleeve, as the bores are too small to be inspection windows. This can also result in leaking connections, as the insertion depth of the pipe end cannot be monitored sufficiently. In addition, the bores can also be deformed and further reduced during the pressing of the pressing sleeve or even result to the formation of pressing folds.

Therefore, users of the described fittings, especially for repairs or small installations, may avoid them and use other joining techniques, e.g. soldering, plastic welding, screwing, gluing, and then have to accept other disadvantages.

The present invention is thus based on the technical problem of improving the aforementioned fitting for pressing and the method for establishing a connection, in particular with small motor-driven or hand-operated pressing tools.

SUMMARY OF THE INVENTION

The above-mentioned technical problem is solved in accordance with the invention by the fact that the pressing sleeve is made of a metal with a microhardness of less than 65 HV 1, in particular less than 50 HV 1, preferably in the range from 40 to 50 HV 1, and that the ratio of wall thickness of the pressing section to outer diameter of the pressing section is less than 0.06, preferably in the range from 0.03 to 0.06. All the above values are determined according to Vickers.

Due to the above described selection of the material and geometry of the pressing sleeve a reduction of the pressing forces or forming work is possible. "Soft" sleeve materials with the specified microhardnesses, measured according to Vickers, in combination with low wall thicknesses lead to good formability of the pressing sleeve. Thus it is also possible with small motor-driven or hand-operated pressing tools to achieve a as round as possible and at the same time as large as possible pressing of the pressing sleeve radially inwards onto the pipe end and in the direction of the radially inward located supporting body.

The hardness test according to Vickers is used to test homogeneous materials and in particular to test the hardness of thin-walled or surface-hardened workpieces and peripheral zones. The hardness test according Vickers is regulated in the standard DIN EN ISO 6507-1:2005 to -4:2005. During the test, an equilateral diamond pyramid with an aperture angle of 136° is pressed into the workpiece under a specified test load. The indentation surface is calculated from the length of the diagonal of the remaining indent, determined by means of a measuring microscope. The ratio of the test load in Newton to the indentation surface (d in millimetres) multiplied by the factor 0.1891 results to the Vickers Hardness (HV).

In order to achieve a tight and mechanically resilient connection, the described fitting allows a uniform, preferably round, radial pressing of the pressing sleeves over the entire length of the cylindrical sleeve part. Despite the low amount of forming work required, a firm and tight connection is achieved because the pipe end is pressed onto a much larger area of the supporting body than it is in the known state of the art systems with stainless steel sleeves.

Due to the extensive surface contact pressure of the pipe, an additional elastomer seal can be dispensed with. The attached pipes therefore do not have to be deburred or calibrated. This type of extensive, uniform pressing also prevents the formation of pressing folds and the sticking of the pressing jaw to the pressing sleeve, as no grooves form in the pressing sleeve during the pressing process, as in known systems with two to three relatively narrow, annular pressing points.

Thus, the fitting for a pipeline system according to the invention with plastic and plastic-metal multilayer composite pipes reduces the forming work, the error susceptibility and the costs compared to known fittings. This means that simpler pressing tools can be used, in particular driven by commercially available machines, e.g. battery-operated drivers, or by hand with the aid of fork/open-end wrenches or levers. The connection technology described is therefore particularly suitable for use on construction sites, also in the context of complete installations and not only for repairs.

The material selection is based on the knowledge that particularly soft metals with a microhardness of less than 65 HV 1, in particular less than 50 HV 1, preferably in the range from 40 to 50 HV 1 measured according to Vickers, can be formed particularly easily and are dimensionally stable after forming and only low restoring forces occur.

According to a further embodiment according to the invention, the pressing sleeve is made of copper, copper alloys or aluminum alloys. According to the invention, these metals, which were not previously used for fittings for plastic pipes or plastic-metal composite pipes, are therefore suitable for forming the material for the pressing sleeve. The materials used can be influenced by targeted heat treatment in such a way that for the present invention favorable properties are achieved, particularly with regard to hardness values.

In addition, the ratio of the length of the pressing section to the outside diameter of the pressing section can be greater than 0.4 for the fitting described, and can preferably be in the range between 0.4 and 0.8. This ensures a reliably large pressing section for the material selection and geometry described above.

The main body and the supporting body may also consist of a hard thermally stable unfilled, filled or reinforced plastic, for example polysulphones, halogenated polyolefins, aromatic polysulphides, polyamides or even a metal, for example copper, copper alloys or iron-based alloys. In addition, the supporting body usually has an outer contour, preferably radially circumferential fins and/or axially extending fins. After the radial pressing of the pressing sleeve onto the pipe end and thus of the pipe end onto the supporting body, the hard material of the supporting body penetrates into the material of the pipe end and leads both to a seal and to a pull-out strength and/or torsional strength.

In another preferred embodiment of the described fitting, the to the main body distal end of the pressing sleeve is flanged outwards, for example in the form of a collar, and protrudes preferably in an angle of up to 90° and in total preferably 0.9 to 1.2 mm above the outer surface of the pressing sleeve. Due to the bending up and the bending radii funnel-shaped opening at the distal end of the pressing sleeve is created, which is directed inwards and can be used to center the pipe end, making it easier to attach the pipe end to the fitting.

In addition, the proximal to the main body end of the pressing sleeve has an outwardly protruding bead. This bead or flange is thus also formed from the material of the pressing sleeve, whereby the favorable forming properties of the material and the geometry of the pressing sleeve are again advantageous. Thus, the two end flanges or beads form two circumferential limits for a pressing tool, which enable a safe guidance and positioning both during the application of the pressing tool and during pressing.

Alternatively, a retaining ring connected to the main body may be provided to secure the pressing sleeve to the proximal end. This means that the pressing sleeve is not directly connected to the main body, but is connected to the retaining ring. In this case the retaining ring serves as a second limit for the pressing tool.

Thus, the pressing sleeve is either directly connected to the main body or by means of the retaining ring to the main body. In both embodiments, the connection of the pressing sleeve to the main body or to the retaining ring can be realized by means of a tongue-and-groove connection. This type of connection allows the pressing sleeve to be mounted easily, which is usually done at the factory.

A further embodiment of the pressing sleeve is that the end of the pressing sleeve proximal to the main body has an alternately interrupted edge with holding sections and recesses and that the recesses on the circumferential side release an angular section greater than 180°. In particular, the recesses and retaining sections are evenly distributed around the circumference and at least two, preferably three, retaining sections and recesses are provided.

The previously described embodiment of the proximal edge of the pressing sleeve can be easily fabricated due to the easily formable material of the pressing sleeve and the open design of the proximal end allows easy adjustment of the strength of the latching on the main body or retaining ring.

In addition, before and after pressing it is checkable that the pipe end has been inserted correctly and then pressed due to the enlarged recesses. The open areas of the cut-outs serve as inspection windows and are larger than in systems known from the state of the art.

The large recesses of the described pressing sleeve, which are open towards the sleeve end, also ensure that no stresses build up in this area of the pressing sleeve during pressing and burr formation is avoided.

The technical problem shown above is also solved by a method for establishing a connection between a fitting and a pipe, with a fitting described above, the fitting having a supporting body and a pressing sleeve with a cylindrical pressing section, in which a pipe end is arranged between the supporting body and the pressing sleeve, in which a pressing tool with a cylindrical pressing contour is applied to the pressing section and in which the pressing sleeve is pressed radially cylindrically by the pressing contour over the length of the pressing section.

By pressing the pressing sleeve with the cylindrical pressing section by means of a pressing tool, which also has a cylindrical pressing contour, the pressing sleeve is formed cylindrically along the pressing section, i.e. uniformly and evenly distributed radially. With this method, a uniform pressing of the pressing sleeve over a given length of the pressing section is achieved. Preferably the pressing is as round as possible, i.e. seen in radial direction with the same penetration depth. This makes the surface pressed against the pipe end between the pressing sleeve and the pipe end larger and more even compared to conventional press profiles with different penetration depths of the pressing sleeve into the material of the pipe end. Due to this extensive surface contact pressure of the pipe end, an additional elastomer seal can be dispensed with. The inserted pipes therefore do not have to be deburred or calibrated.

This embodiment of extensive, uniform pressing also prevents the formation of pressing folds and the clamping of the pressing jaw, since no furrows form in the sleeve, as is the case with known systems with two to three relatively narrow, annular pressing points.

It is also advantageous here if the pressing sleeve is pressed cylindrically over an axial length whose ratio to the outside diameter of the pressing section is greater than 0.4, preferably in the range between 0.4 and 0.8. By maintaining this length-to-diameter ratio, the connection becomes particularly stable and secure.

In another preferred embodiment of the method, the pressing tool is guided at least on one side of the pressing section through a limit formed by the pressing sleeve, preferably through two limits formed by the pressing sleeve. This further improves the method, as it facilitates precise positioning and pressing without the pressing sleeve slipping.

By the described fitting and the method for producing a connection, the error potential is reduced by avoiding loose parts by fixing the pressing sleeve to the main body in advance, by dispensing with an elastic sealing element and thus low susceptibility to dirt, by a good recognisability of the pipe insertion depth and/or by a guide for the pressing tool on both sides.

BRIEF DESCRIPTION OF THE DRAWINGS

In the following, the invention is explained using examples of embodiments with reference to the drawing. The drawings show FIGS. 1 and 2 a first embodiment of a fitting according to the invention, FIGS. 3 and 4 a second embodiment of a fitting according to the invention, FIGS. 5 to 7 a third embodiment of a fitting according to the invention, FIGS. 8 and 9 the third embodiment in detail, FIG. 10 the main body used in the embodiments, and FIGS. 11 to 13 the third embodiment in three phases of the establishment of a connection with a pipe end.

DESCRIPTION OF THE INVENTION

In the following description of the various exemplary embodiments according to the invention, components and elements with the same function and mode of operation are provided with the same reference symbols, even if the components and elements in the various exemplary embodiments may have differences in dimension or shape.

Figure 1:
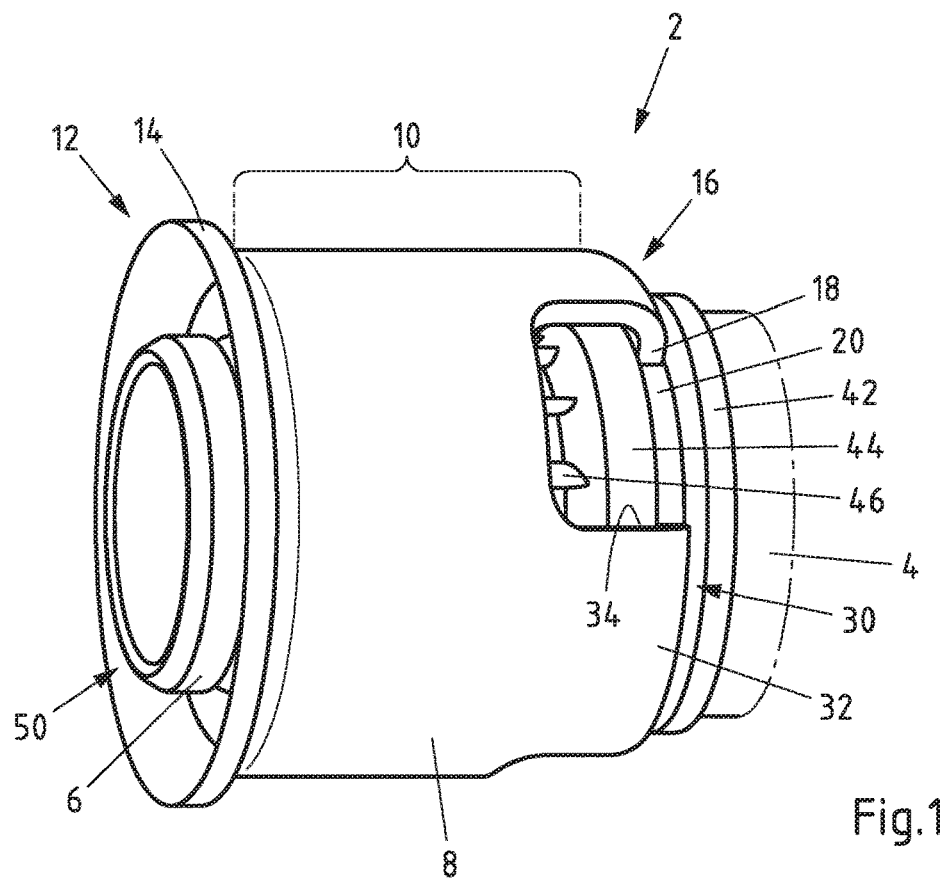
Figure 2:
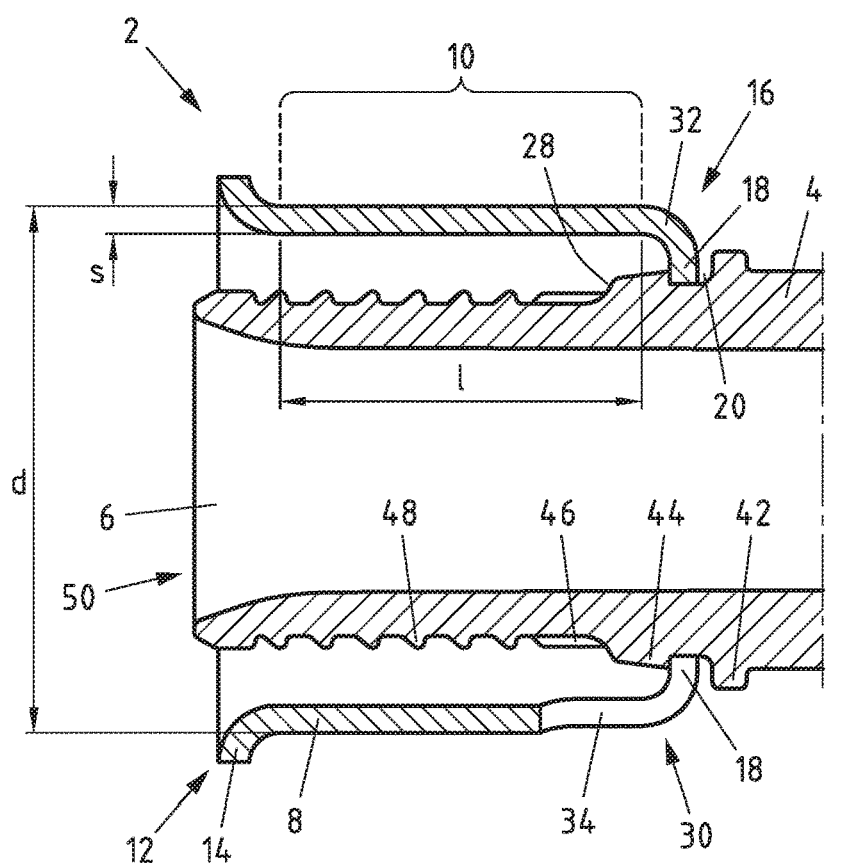

FIGS. 1 and 2 show a first exemplary embodiment of a fitting 2 to be connected to at least one pipe, in particular a plastic pipe or plastic-metal composite pipe. The fitting 2 has a main body 4, which is only shown with one end and is formed at at least one further end extending to the right in FIGS. 1 and 2 with the same fitting geometry or a different connection geometry.

A supporting body 6 connected to the main body 4 and integrally formed in the present case is provided in order to be inserted into a pipe end (not shown here). For a representation with pipe end, please refer to the discussion in FIGS. 11 to 13 below. In addition, a pressing sleeve 8 connected to the main body 4 is provided for receiving the pipe end, the pressing sleeve 8 having a cylindrical pressing section 10.

In accordance with the invention, the pressing sleeve 8 is made of a metal with a microhardness of less than 65 HV 1, in particular less than 50 HV 1, preferably in the range from 40 to 50 HV 1 measured according to Vickers. As a result, the microhardness of pressing sleeve 8 is so low that, on the one hand, it can be easily and reliably formed into the required shape during production and, on the other hand, it can be formed just as easily and reliably during the production of a pipe connection.

Furthermore, the ratio of the wall thickness s of the pressing section 10 to the outside diameter d of the pressing section 10 is less than 0.06 and preferably is in the range from 0.03 to 0.06. In the exemplary embodiment shown, a value of 0.05 is present. For example, nominal diameters of 16, 20 or 25 mm can be specified as outer diameters, whereby these numbers are not to be understood as restrictive.

A further characteristic of the geometry of the pressing sleeve is the ratio of the length l of the pressing section 10 to the outside diameter d of the pressing section 10, whose value is greater than 0.4, preferably between 0.4 and 0.8. Due to this length geometry, a good deformability is achieved with a given wall thickness and diameter.

The above mentioned hardness values for the material of the pressing sleeve 8 are in a range which allows the use of copper, copper or aluminum alloys. By a suitable selection of material, geometry and manufacturing processes the pressing sleeves can be manufactured inexpensively.

As further shown in FIGS. 1 and 2, the to the main body 4 distal end 12 of the pressing sleeve 10 is flanged outwards so that a collar 14 is formed which is bent outwards up to 90° and protrudes 0.9 to 1.2 mm outwards. Similarly, the proximal to the main body 4 end 16 of the pressing sleeve 10 has a radially inwardly directed collar 18 which engages in a groove 20 formed on the main body 4. In this way, the pressing sleeve 8 is connected to the main body 4.

The collar 14 has a tapered inner contour which facilitates the insertion of a pipe end into the pressing sleeve 8. The curved outside of the collar 14 again represents a one-sided limit and a connected guide for a pressing tool, as explained below.

Figure 3:
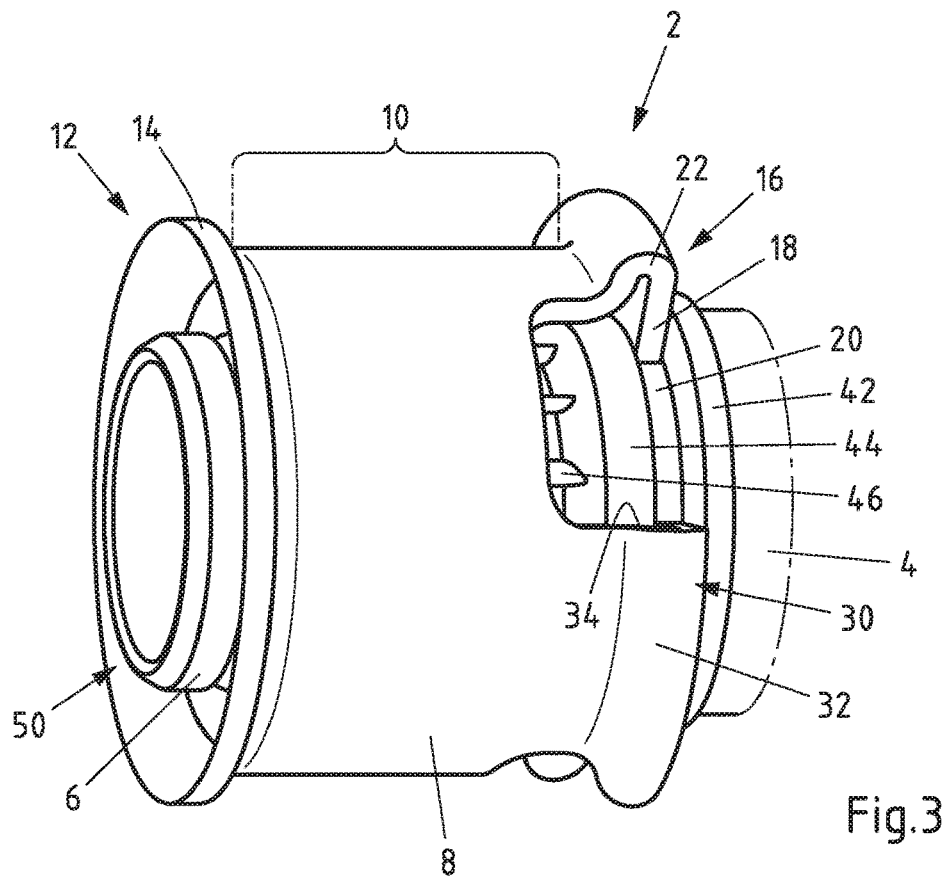
Figure 4:
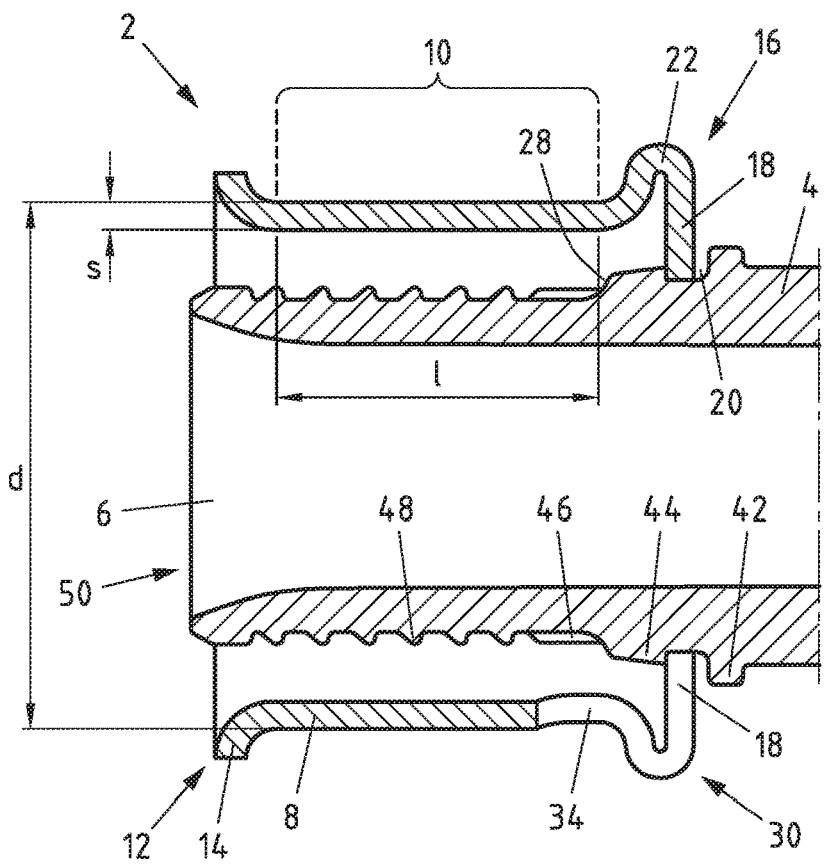

FIGS. 3 and 4 show a second exemplary embodiment of a fitting 2 according to the invention. The construction of fitting 2 broadly corresponds to the construction of the fitting according to FIGS. 1 and 2, so that the same reference marks designate the same elements of fitting 2. The difference in design is that the collar 18 arranged at the end 16 of the pressing sleeve 10 initially forms an outwardly projecting bead 22. Together with the collar 14, two circumferential limits for a pressing tool are formed, which axially limit the pressing section 10 on both sides. Thus an improved guidance of a pressing tool is achieved as with the first exemplary embodiment.

Figure 5:
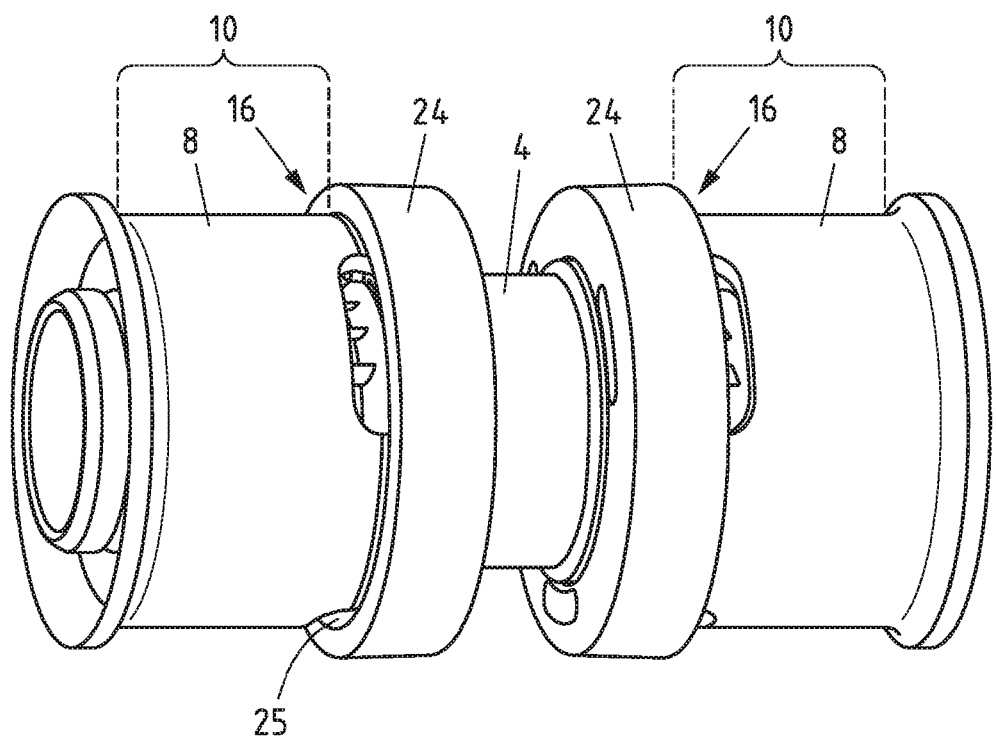
Figure 6:
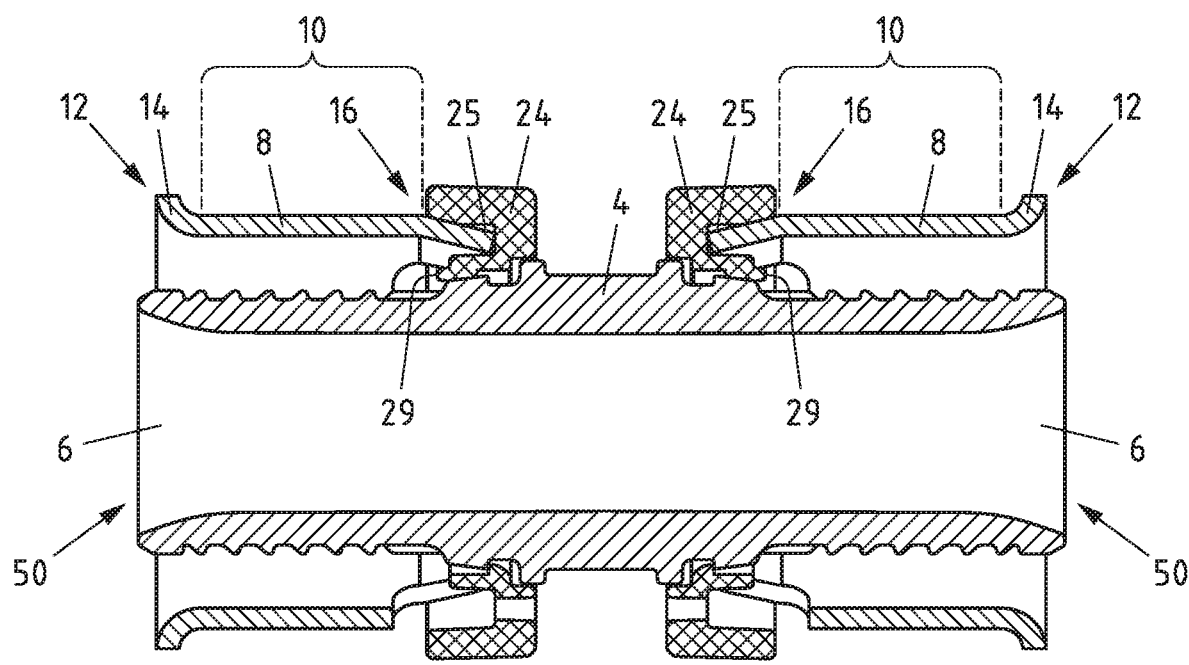

FIGS. 5 and 6 show a third exemplary embodiment of a fitting 2 according to the invention, whereby fitting 2 is designed as a straight fitting with two pressing sleeves 8 for connecting two pipes. The construction of the fitting 2 again broadly corresponds to the construction of the fitting according to FIGS. 1 and 2, so that again the same reference symbols designate the same elements of fitting 2.

The difference in the design is that a retaining ring 24 connected to the main body 4 is provided for fastening the pressing sleeve 8 to the main body 4. The retaining ring 24 is preferably made of plastic in order to influence the retaining properties via the material properties, in particular the degree of hardness, and the geometry, e.g. very high clamping forces or simple exchangeability. The retaining ring 24 can also be made of a metal. The retaining ring 24 is connected to the main body 4 by latching and/or clamping.

The retaining ring 24 has a circumferential groove 25 aligned with the distal end 12 of the pressing sleeve 8, in which the proximal end 16 of the pressing sleeve 8 engages and is secured by clamping and/or latching. Thus, in a similar way to the second exemplary embodiment, two circumferential limits are formed to guide a pressing tool through the collar 14 and the retaining ring 24, which axially limit the pressing section 10 on both sides.

In the subsequent discussion of further features and method steps, reference is made in each case to the third exemplary embodiment. This is not to be understood as restrictive, since the first two exemplary embodiments can also be designed and processed in the same way.

Figure 7:
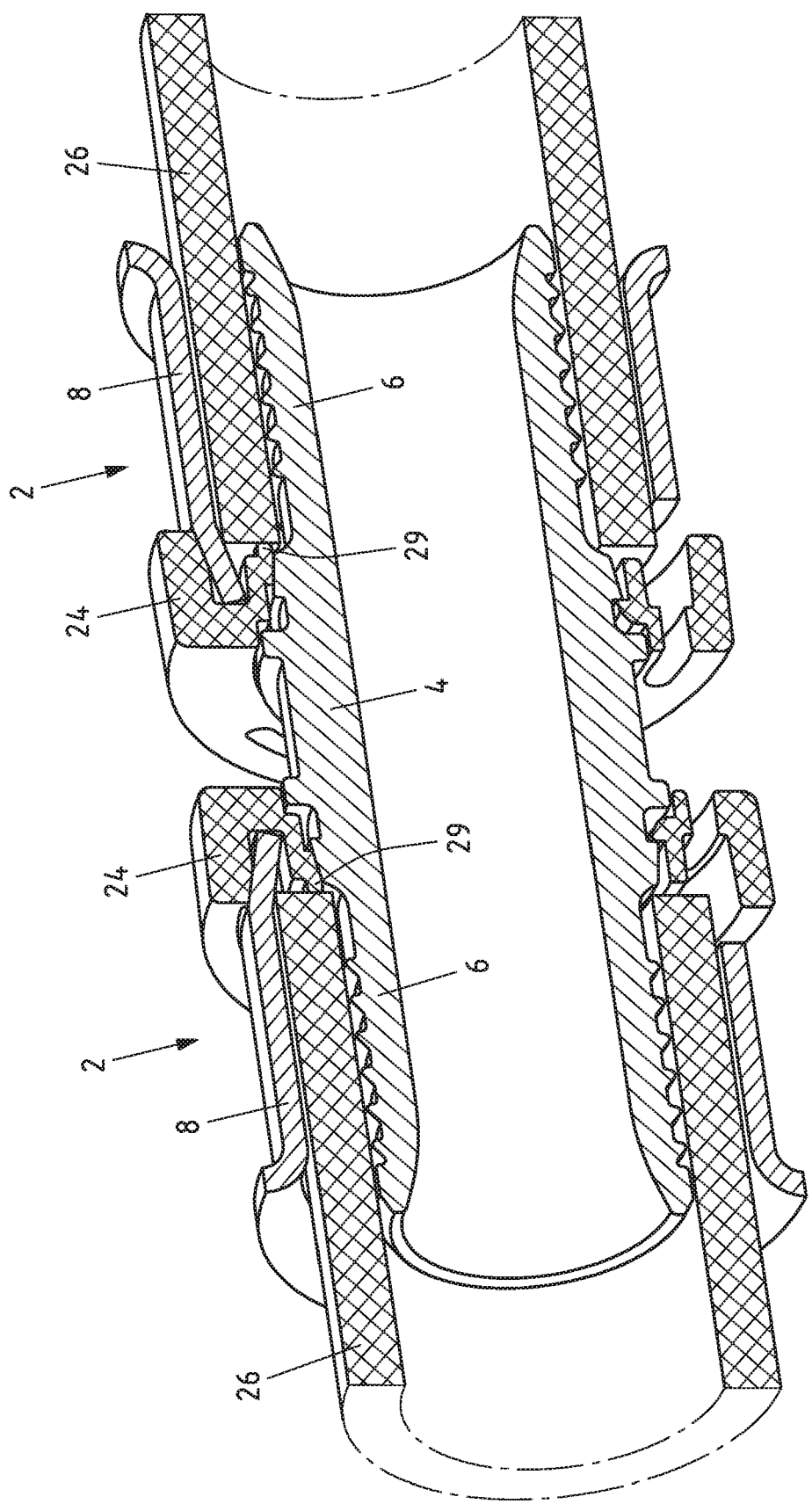

FIG. 7 shows the third embodiment of fitting 2 according to FIGS. 5 and 6, where a pipe 26 has been inserted into the pressing sleeves 8 on both sides. The pipes 26 are designed as plastic pipes. It is also possible to design pipes 26 as plastic-metal composite pipes. The pipes or pipe ends 26 are each inserted up to a limit 29 formed on the inside of the retaining ring 24. A total of three limits 29 are provided on the circumference of the retaining ring 24 for this purpose, so that in FIGS. 6 and 7 the limit 29 can only be seen above the pipe end 26 in FIGS. 6 and 7.

Figure 8:
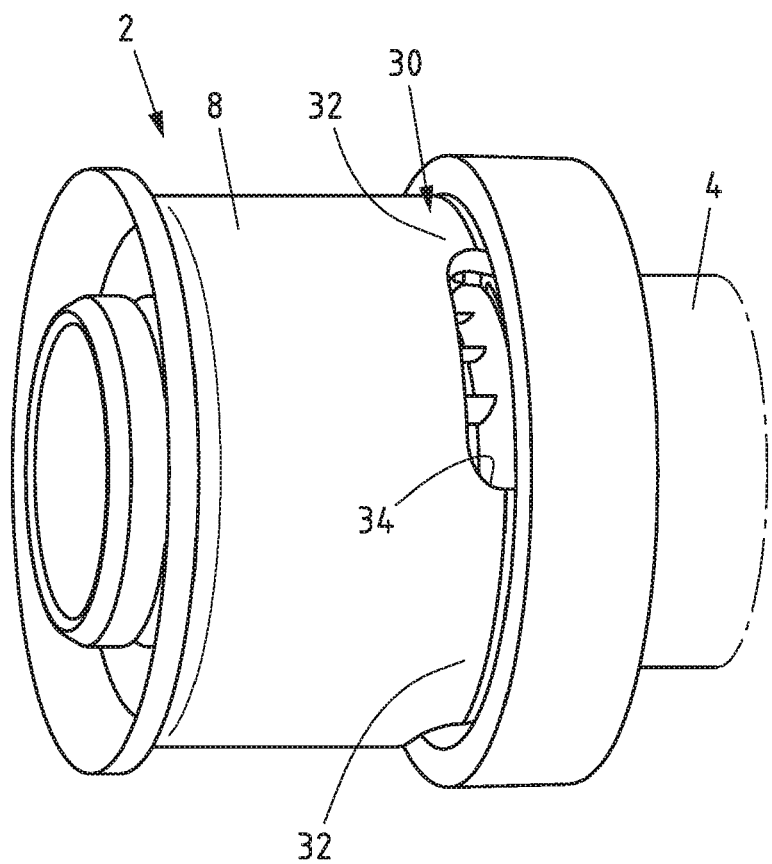
Figure 9:
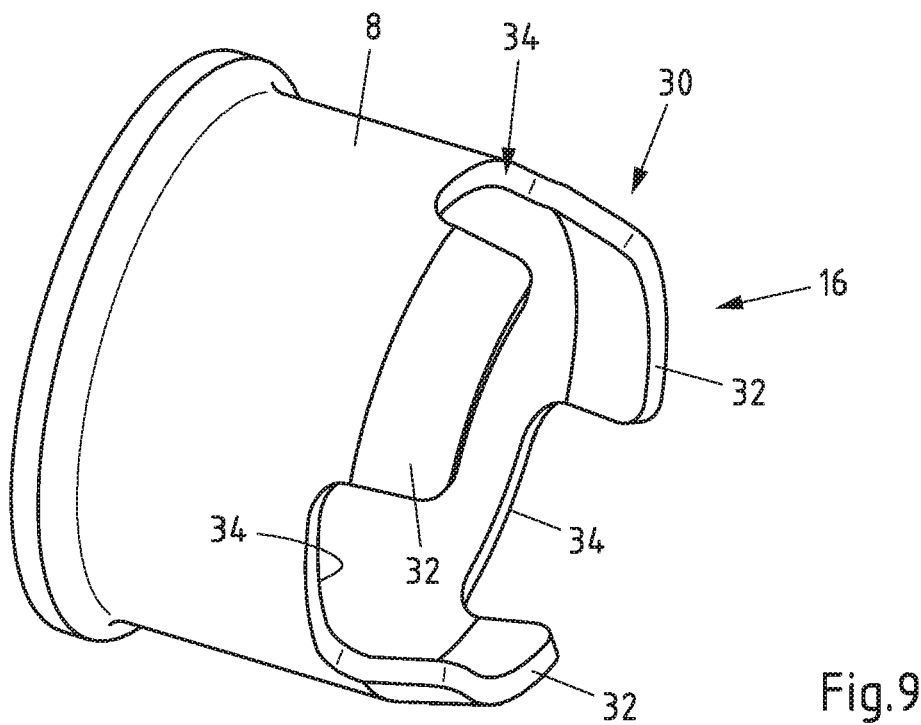

In the exemplary embodiments shown in FIGS. 1 to 7 and in the third exemplary embodiment again shown in detail in FIGS. 8 and 9, it is provided that the end 16 of the pressing sleeve 8 proximal to the main body 4 has an alternately interrupted edge 30 with holding sections 32 and recesses 34 and that the recesses 34 on the circumferential side release a total angular section of greater than 180°. This means that the circumferential length of the recesses is greater than the circumferential length of the holding sections 32. The angle section released by the recesses can be 220° or 240°, for example.

As can be seen from the figures, the holding sections 32 and the recesses 34 are evenly distributed around the circumference. This results in a stable construction. As can be seen from the perspective illustrations in FIGS. 1, 3, 5 and 8, the recesses 34 in the assembled state result in large inspection windows which allow a view into the area into which the pipe end 26 must be pushed when correctly assembled. Thus, before and especially after the pressing of the pressing sleeve 8, a clear control of the produced connection can be carried out.

Figure 10:
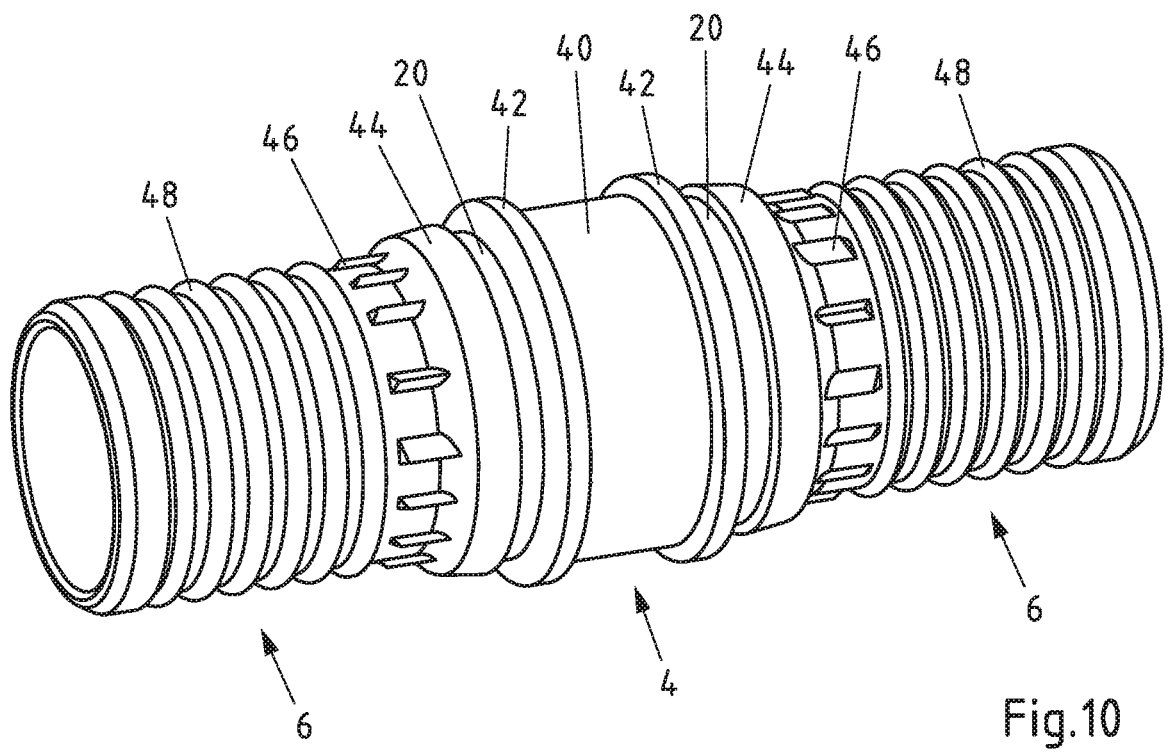

FIG. 10 shows the main body 4 together with two support bodies 6 connected to it. The main body 4 has an essentially axially symmetrical shape with a central section 40 with two adjacent circumferential projections 42 and 44, which form the groove 20 mentioned above between them. Axially to the outside, axially extending webs or fins 46 are arranged, which penetrate into the material of the pipe end when the pressing sleeve is pressed and form an anti-rotation device. This is followed by several radially rotating fins 48, which also penetrate into the material of the pipe end when the pressing sleeve is pressed and form a pull-out protection. Deviating from this illustration, the axial and radial fins can also be arranged in a different order. The two distal ends 50 of the support bodies are beveled at the outer edges to facilitate insertion of supporting body 6 into a pipe end. As far as can be seen, the features described above are also marked in FIGS. 1 to 9.

Figure 11:
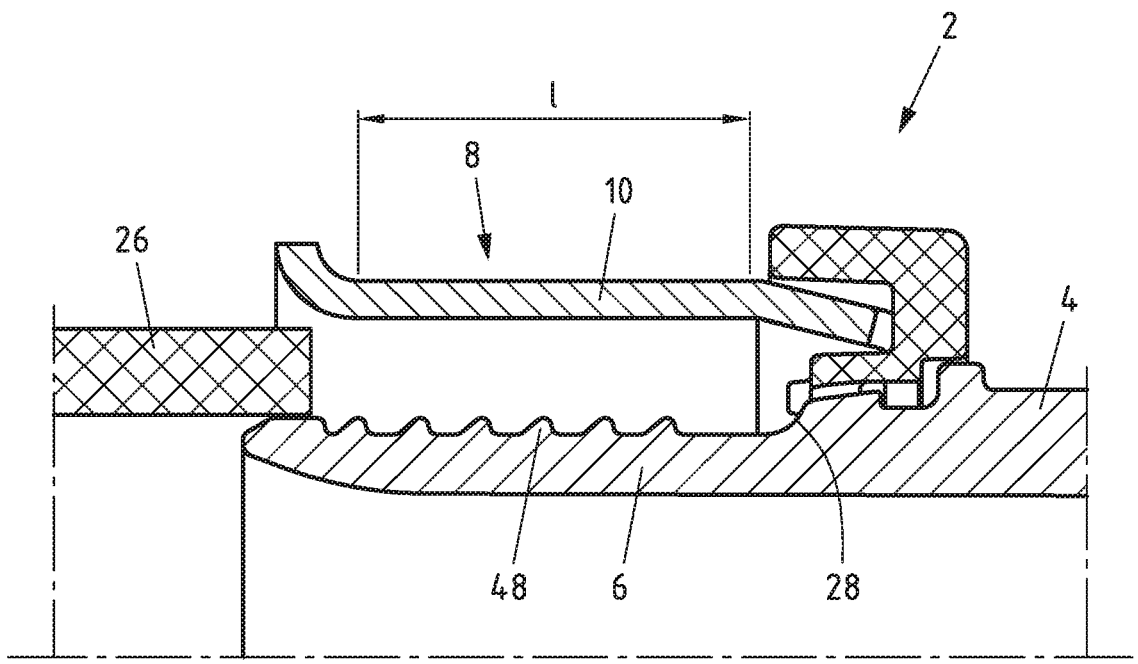
Figure 12:
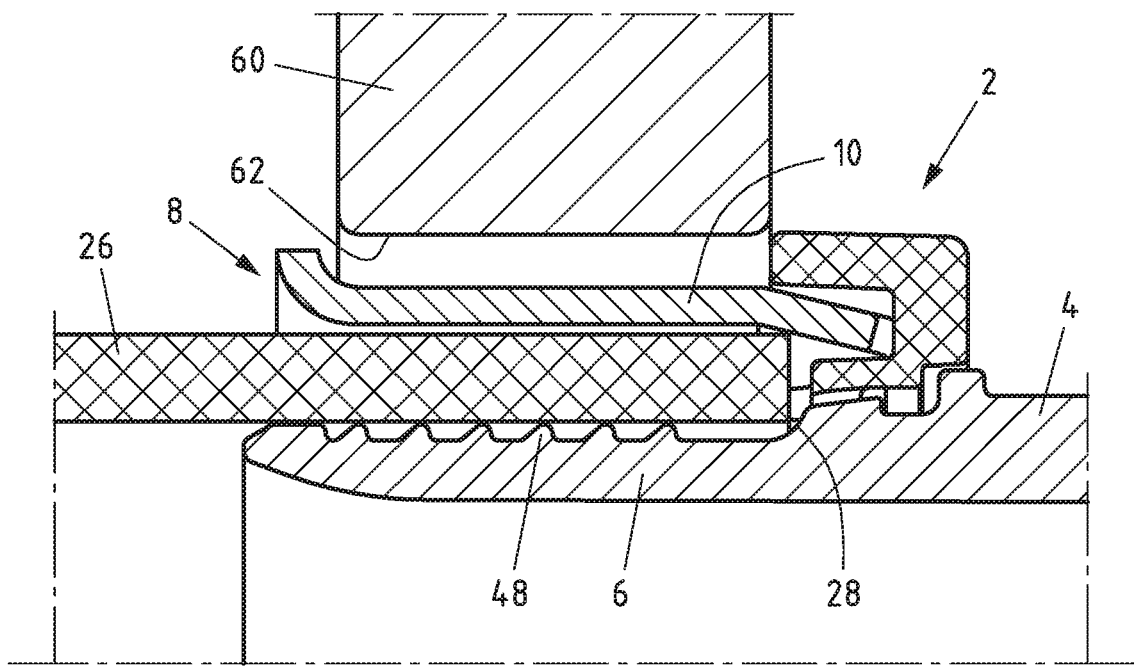
Figure 13:
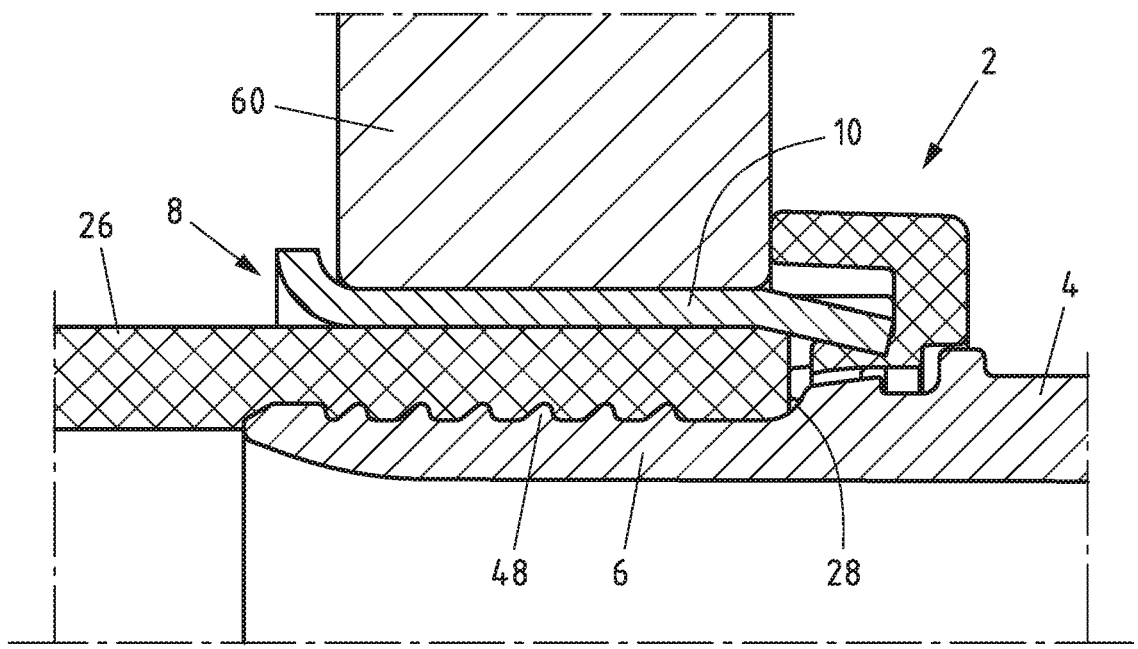

FIGS. 11 to 13 show three phases of a pressing process with a fitting according to the third exemplary embodiment. In the method described above for establishing a connection between a fitting 2 and a pipe 26, said fitting 2 comprising a supporting body 4 and a pressing sleeve 8 having a cylindrical pressing portion 10.

First FIG. 11 shows the insertion of the pipe 26, so that the pipe end 26 is arranged between the supporting body 6 and the pressing sleeve 8. It should be ensured that the pipe end 26 is pushed in up to the limit 28.

Then, according to FIG. 12, a pressing tool 60 or a pressing jaw 60 of a pressing tool with a cylindrical pressing contour 62 is attached to the pressing section 10. This results in a flat contact of the cylindrical pressing contour 62 on the cylindrical pressing section 10.

As shown in FIG. 13, the pressing sleeve 8 is radially cylindrically pressed by the pressing contour 62 over the length l of the pressing section 10. This creates a flat contact of the pressing sleeve 8 at pipe end 26, which is then pressed into the contoured surface (fins 46 and 48) of supporting body 6.

As can be seen from the discussion of the exemplary embodiment fitting 2 according to the invention, the pressing sleeve 8 is pressed cylindrically over an axial length l whose ratio to the outer diameter d of the pressing section 10 is greater than 0.4, preferably in the range between 0.4 and 0.8.

It is also clear from FIGS. 12 and 13 that the pressing tool 60 is guided on both sides of the pressing section 10 by limits formed by the pressing sleeve 8 and the retaining ring 24 during setting and pressing.

The invention claimed is:

1. A fitting to be connected to at least one pipe, comprising:
   a main body,
   at least one supporting body connected to the main body for insertion into a pipe end, and
   at least one pressing sleeve connected to the main body for receiving the pipe end,
   wherein the pressing sleeve has a cylindrical pressing portion,
   characterised in that,
   the pressing sleeve is made of a metal with a microhardness of less than 65 HV as measured according to Vickers, and
   the ratio of wall thickness of the pressing section to the outer diameter of the pressing section is less than 0.06.

2. The fitting according to claim 1,
   characterised in that,
   the ratio of the length of the pressing section to the outer diameter of the pressing section is greater than 0.4.

3. The fitting according to claim 1,
   characterised in that,
   the pressing sleeve is made of copper or aluminum.

4. The fitting according to claim 1,
characterised in that,
the distal end of the pressing sleeve is flanged outwards, and
the proximal end of the pressing sleeve has an outwardly projecting bead.

5. The fitting according to claim 1,
characterised in that,
the distal end of the pressing sleeve is flanged outwards, and
a retaining ring connected to the main body is provided for attaching the pressing sleeve.

6. The fitting according to claim 1,
characterised in that,
the proximal end of the pressing sleeve has an alternately interrupted edge with holding sections and recesses and
the recesses on the circumferential side release a total angular section of greater than 180°.

* * * * *